(12) United States Patent
McArthur

(10) Patent No.: US 7,931,427 B1
(45) Date of Patent: Apr. 26, 2011

(54) PROGRAMMABLE CUTTING TOOL COOLANT APPARATUS

(76) Inventor: Erich McArthur, Winder, GA (US)

( * ) Notice: Subject to any disclaimer, the term of this patent is extended or adjusted under 35 U.S.C. 154(b) by 763 days.

(21) Appl. No.: 11/985,730

(22) Filed: Nov. 19, 2007

(51) Int. Cl.
    *B23Q 11/10* (2006.01)
(52) U.S. Cl. .......................................... 409/136; 408/61
(58) Field of Classification Search .................. 409/135, 409/136; 408/56–61; 407/11; 451/449; B23Q 11/10; B23B 27/10
    See application file for complete search history.

(56) References Cited

U.S. PATENT DOCUMENTS

| | | | | |
|---|---|---|---|---|
| 3,781,024 A | * | 12/1973 | Ganser et al. | 279/20 |
| 3,868,195 A | * | 2/1975 | Anderson et al. | 408/61 |
| 4,778,315 A | * | 10/1988 | Duffy et al. | 409/136 |
| 4,986,703 A | * | 1/1991 | Hampl et al. | 409/131 |
| 5,190,421 A | * | 3/1993 | Wen et al. | 408/56 |

FOREIGN PATENT DOCUMENTS

| | | | | |
|---|---|---|---|---|
| JP | 11320325 | A | * | 11/1999 |
| JP | 2000024872 | A | * | 1/2000 |
| JP | 2001198768 | A | * | 7/2001 |
| JP | 2006123013 | A | * | 5/2006 |

* cited by examiner

*Primary Examiner* — Daniel W Howell

(74) *Attorney, Agent, or Firm* — Rodgers & Rodgers

(57) ABSTRACT

A programmable apparatus for cooling cutting tools including a pair of channels formed in the apparatus and formed from a pair of circular channel members, a nozzle associated with each channel to direct fluid onto the cutting tool, and control means to selectively direct fluid to the channels.

19 Claims, 10 Drawing Sheets

PROGRAMMABLE CUTTING TOOL COOLANT APPARATUS

BACKGROUND OF THE INVENTION

In the operation of machine tools, a rotating cutting tool is held in place by means of a spindle and rotated for the purpose of cutting metal or other material. This is accomplished in a programmable machine by means of multiple tools held in a magazine and then automatically withdrawn from the magazine to replace one cutting tool with another according to particular machining requirements. The actual cutting operation produces excessive heat which obviously can be detrimental to the tool itself or to the material being machined. Therefore, the cutting tool must be cooled to prevent the adverse effects of overheating. In practice, fluid is dispensed through a manual nozzle mounted in the vicinity of the cutting tool. When the machine program causes a cutting tool to be changed, it is necessary to stop the machine and manually redirect the nozzle so that the fluid is dispersed in the optimum direction for cooling the cutting tool. This method causes undesirable machine downtime and can be hazardous to machine operators due to the necessity of having the operator's hands in close proximity to sharp moving cutting tools.

BRIEF SUMMARY OF THE INVENTION

A programmable apparatus for cooling rotating cutting tools including a pair of channels formed within the apparatus with at least one nozzle associated with each channel for spraying fluid onto the cutting tool. A pneumatic cylinder includes a spool coaxially disposed within a chamber generally adjacent the open ends of the channels with an annular notch formed in the spool with the spool programmable for selectable alignment with the channel openings to allow fluid to flow from the apparatus intake around the notch and into the selected channel and out the respective nozzle for purposes of cooling the cutting tool. Alternatively, fluid flow to the respective channel is controlled by a combination solenoid and valve device.

DETAILED DESCRIPTION OF THE INVENTION

Figure 1:
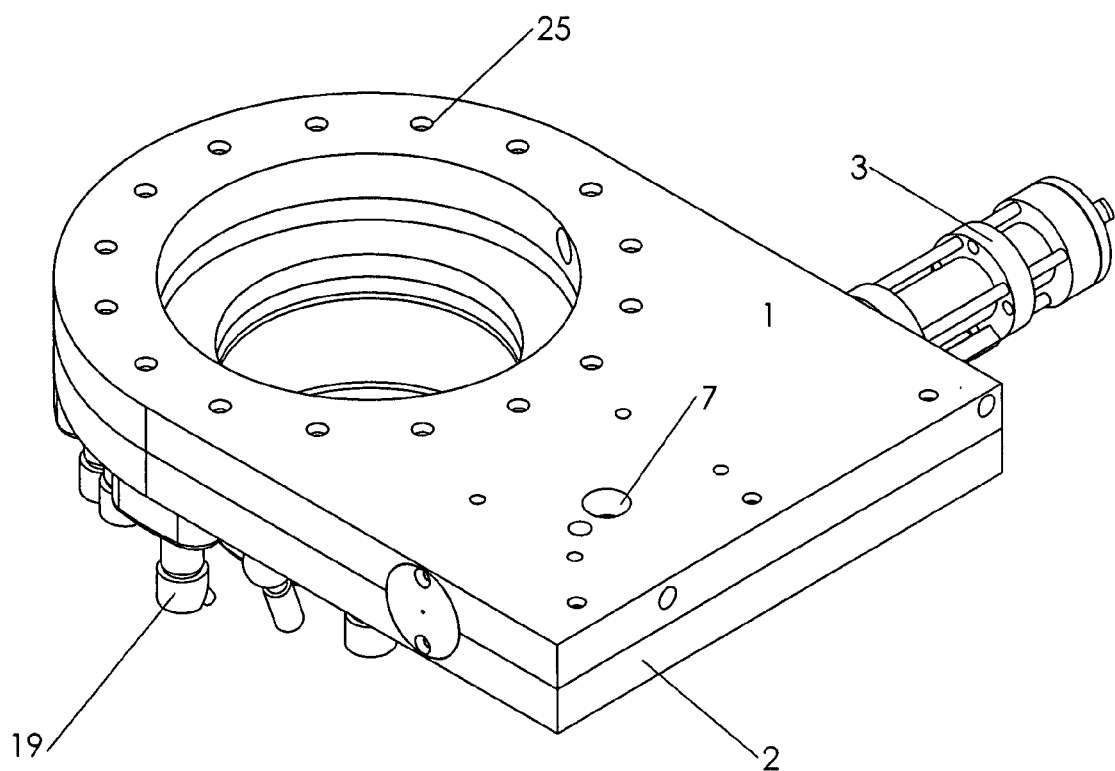
FIG. 1 is a perspective view of a programmable cutting tool coolant apparatus according to this invention.
Figure 2:
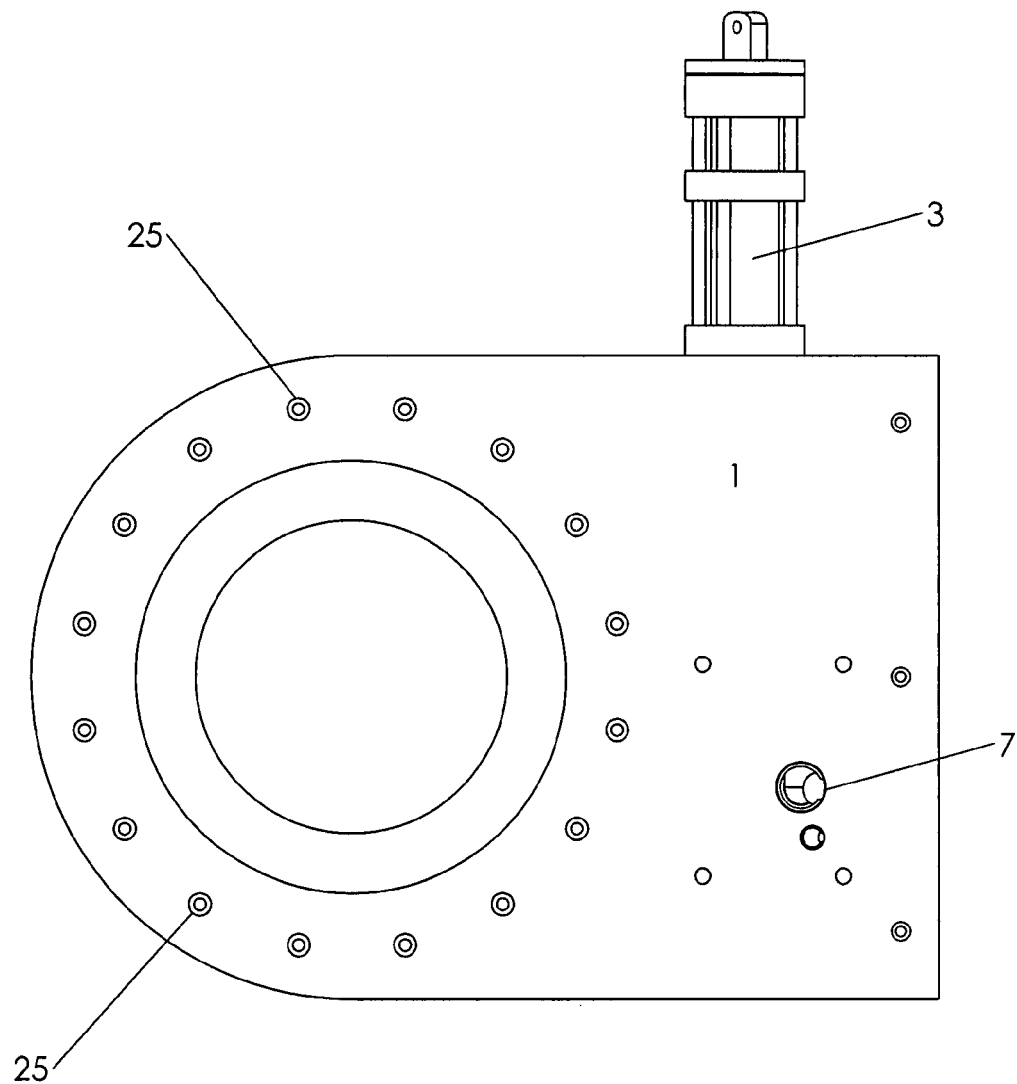
FIG. 2 is a top plan view of the apparatus.

In the drawings, the numeral 1 designates the top plate of the cutting tool coolant apparatus with lower plate 2 disposed therebelow and in face contacting relation therewith. Pneumatic cylinder 3 extends laterally outward from combined top plate 1 and lower plate 2 and is shown in greater detail in FIGS. 3 and 4. More specifically, pneumatic cylinder 3 includes piston 3a and cylinder rod 3b which are activated pneumatically in a manner well known in the art and programmable to perform required functions also as well known in the art. Spool 4 is disposed within chamber 5 formed within top and lower plates 1 and 2. Annular notch 6 is formed in spool 4 and spool 4 is operationally interconnected to cylinder rod 3b.

Fluid is introduced into the apparatus through fluid inlet aperture 7 which is in fluid communication with gates 8, 9, 10 and 11 by means of feeder channel 12. Since spool 4 is slidable within chamber 5, annular notch 6 is adapted for alignment with gates 8-11, respectively, as operational requirements dictate. If it is desired to isolate gate 8 from gates 9-11, input conduit 12a is provided and wall 12b is disposed in feeder channel 12. By this means, one type of fluid, such as air, can be fed into gate 8 and another fluid into gates 9-11.

Figure 3:
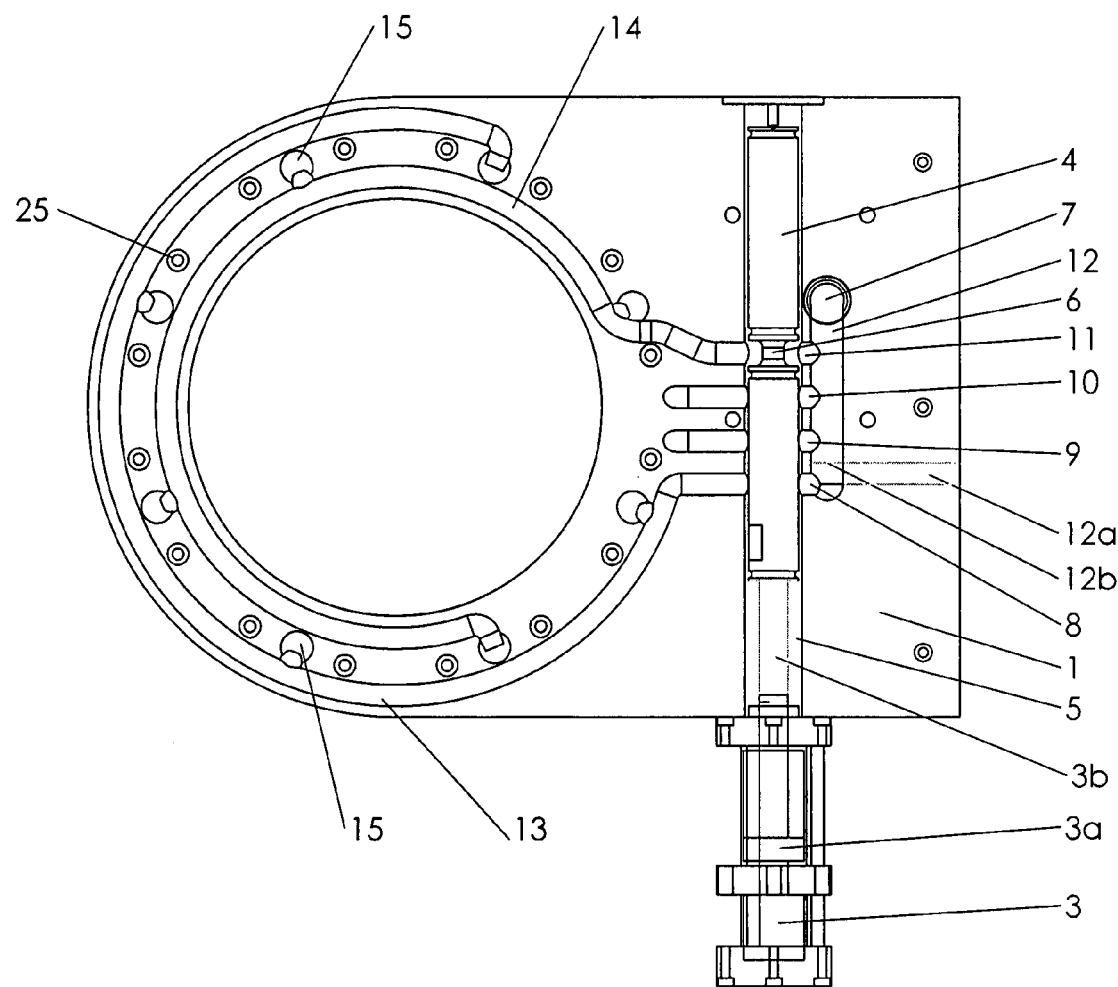
FIG. 3 is a plan view of the underside of the top plate.

As shown in FIG. 3, semicircular channel members 13 and 14 are in fluid communication with gates 8 and 11, respectively. Associated with each of the semicircular channel members 13 and 14 are four equally spaced partial exit ports 15.

Figure 4:
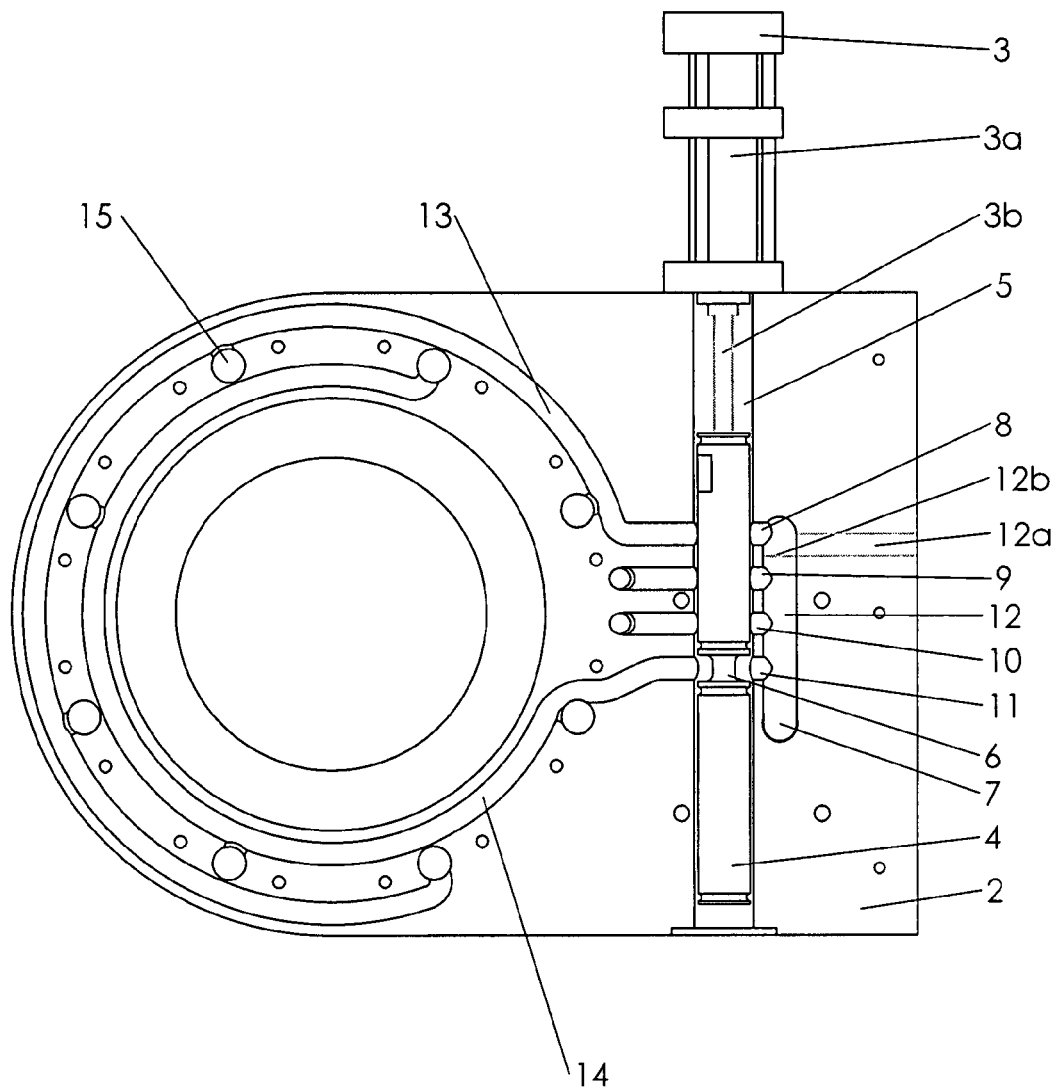
FIG. 4 is a plan view of the upper side of the lower plate.

The structure shown in FIG. 4 is complimentary to that shown in FIG. 3 and the same numerals used in connection with top plate 1 are used to identify complimentary structure in lower plate 2. When top plate 1 and lower plate 2 are mated in a face contacting disposition, as shown in FIG. 1, semicircular channel members 13 and 14 of top plate 1 and of lower plate 2 form complete fluid-tight circular channels and corresponding circular exit ports 15. Of course, channel members 13 and 14 are shown as being circular, but other shapes are equally feasible such as oval, rectangular, etc.

Figure 5:
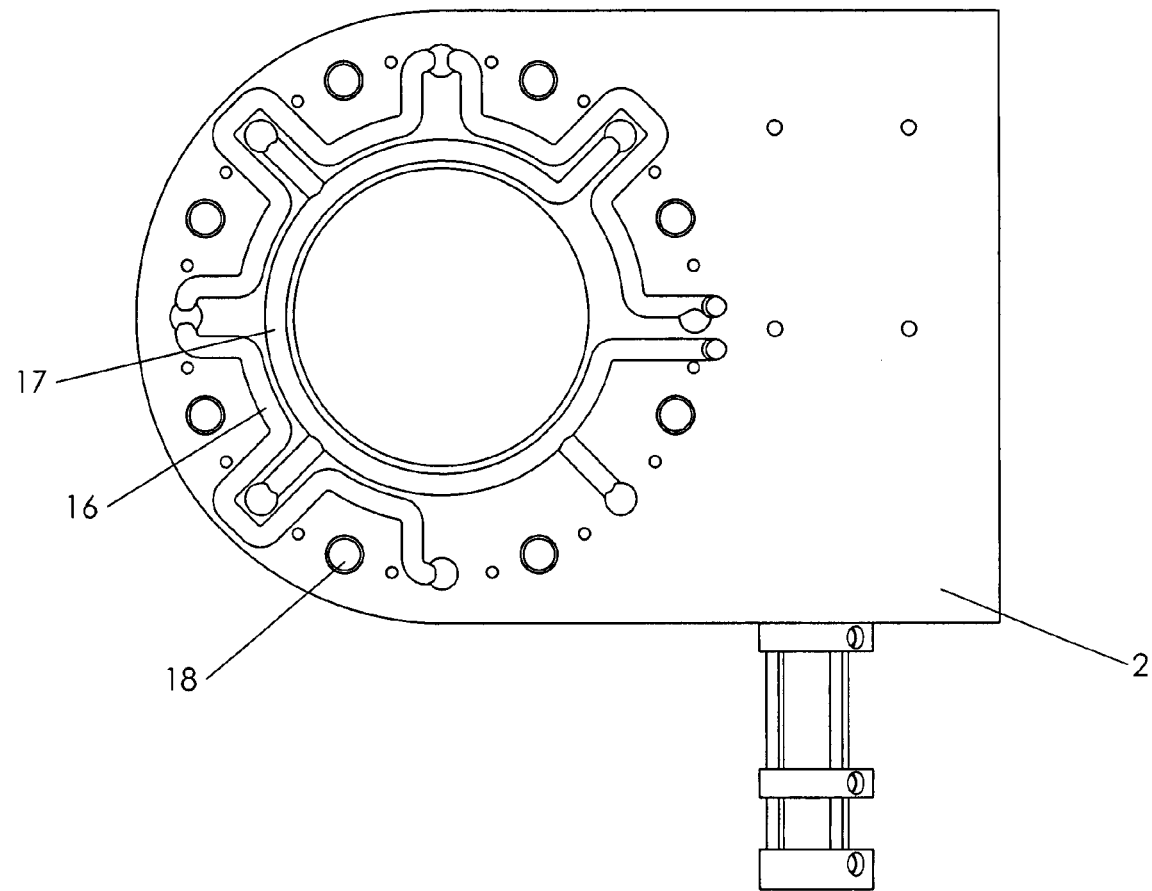
FIG. 5 is a plan view of the underside of the lower plate.

FIG. 5 shows the bottom side of lower plate 2 which includes semicircular channel members 16 and 17, the ends of which are in fluid communication, respectively, with gates 10 and 9. Multiple threaded apertures 18 are formed in lower plate 2 to receive nozzles 19 which are shown in FIG. 1. Specifically, eight equally spaced nozzles 19 extend downwardly from channels 13 and 14.

Figure 6:
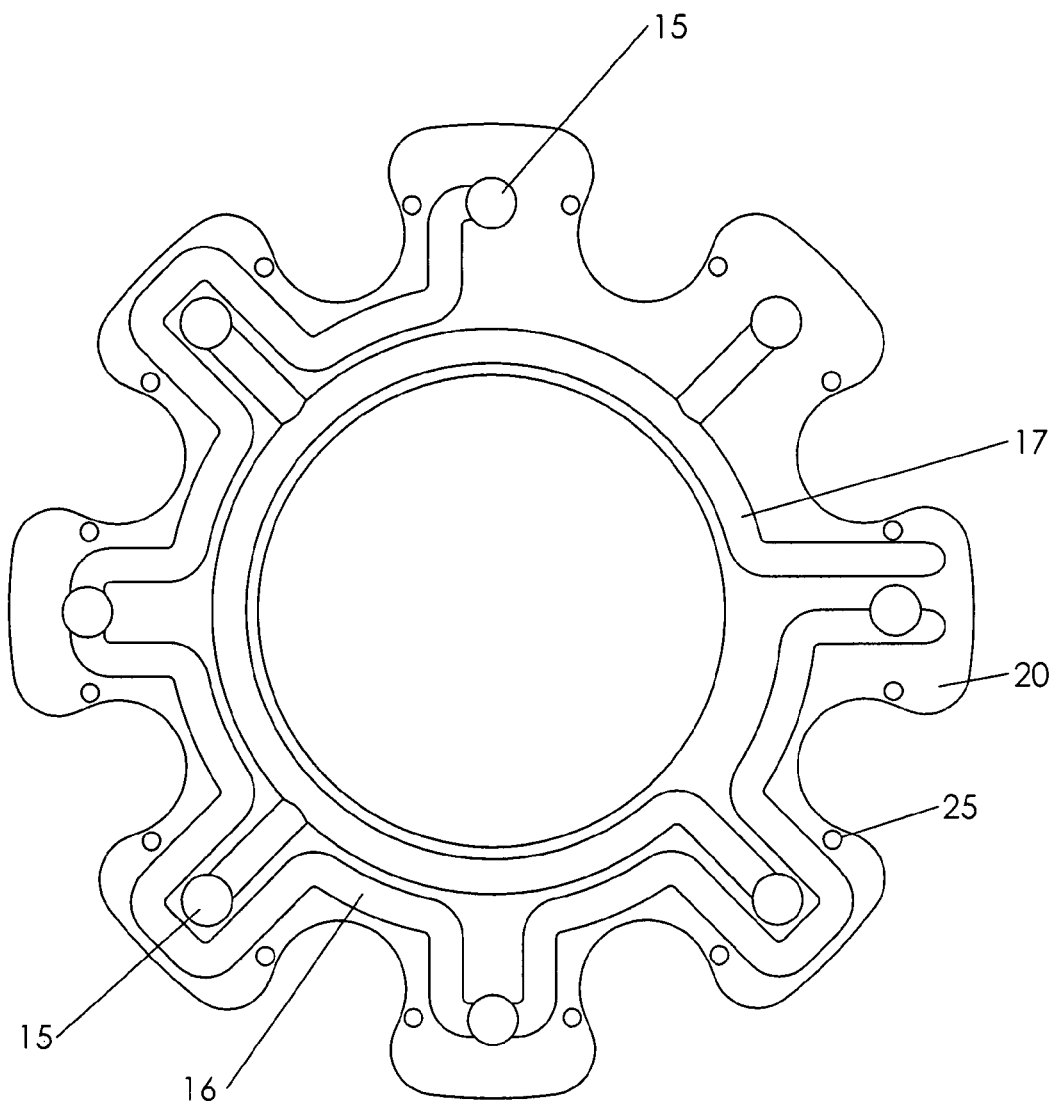
FIG. 6 is a plan view of the upper side of the cone plate.
Figure 7:
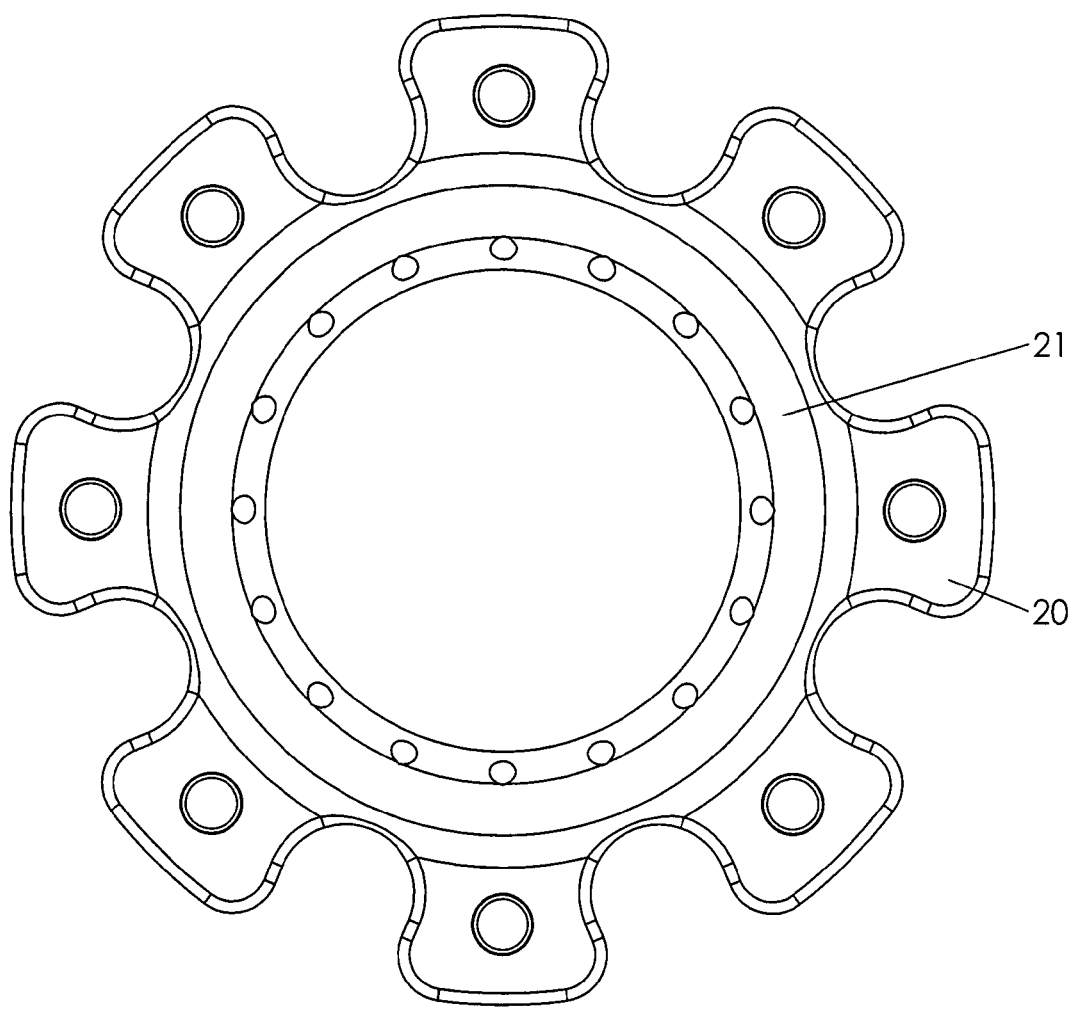
FIG. 7 is a plan view of the underside of the cone plate.
Figure 8:
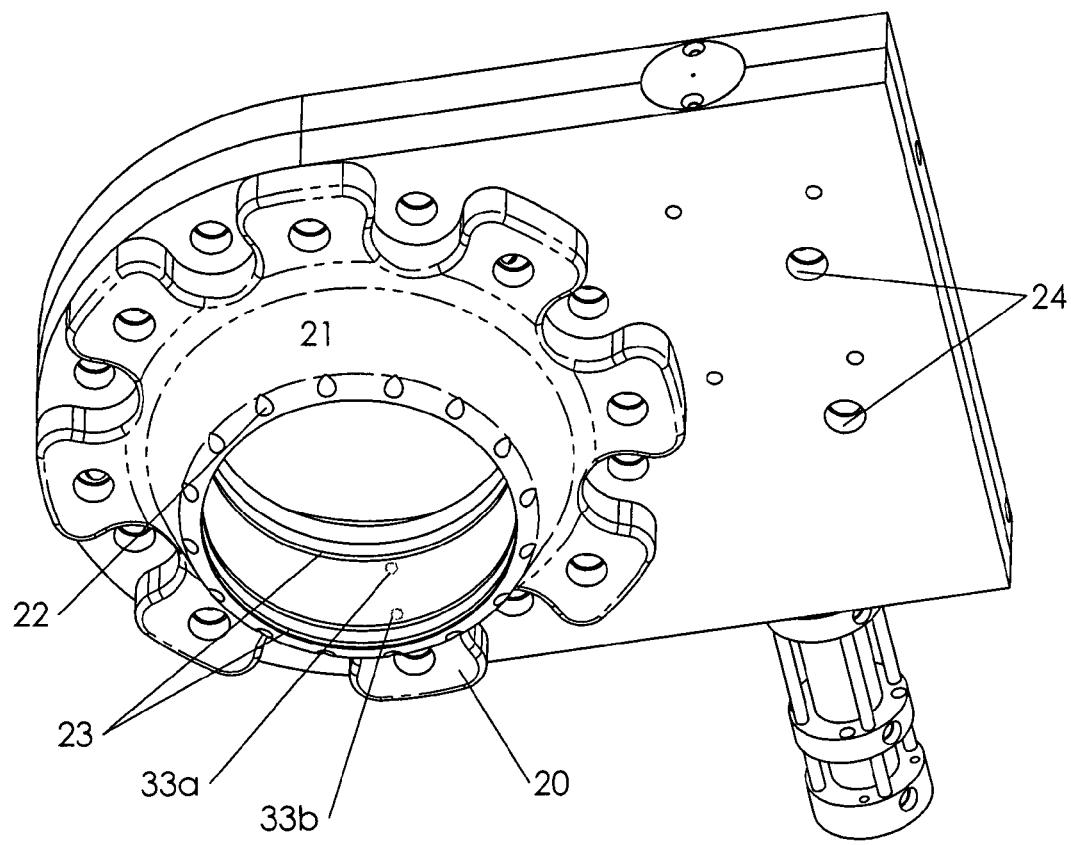
FIG. 8 is a perspective view of the underside of the apparatus.

Cone plate 20 is shown in FIG. 6 and includes semicircular channel members 16 and 17 which correspond to semicircular channel members 16 and 17 in lower plate 2, as well as partial exit ports 15. In like manner to the circular channels formed in connection with top plate 1 and lower plate 2, cone plate 20 is disposed in face contacting relation with the bottom surface of lower plate 2 such that semicircular channel members 16 and 17 in lower plate 2 are aligned with corresponding semicircular channel members 16 and 17 in cone plate 20 to form complete fluid-tight circular channels. Channel members 16 and 17 could be of other shapes such as oval, rectangular, etc. As best shown in FIG. 8, cone plate 20 is notched around the outer periphery so that nozzles 19, which are interconnected to the fluid channels formed by a combination of semicircular channel members 16 and 17 in top plate 1 and cone plate 2, are able to spray downwardly onto the cutting tool. Each channel member 13, 14, 16 and 17 is in fluid communication with four equally spaced circular exit ports 15 so as to accommodate a total of sixteen nozzles 19. In order to complete the apparatus, cone 21 is attached to cone plate 20 in known manner. As shown in FIG. 8, notches 22 are formed along the lower edge of cone 21 to receive and align nozzle extensions 19a. Also, O-rings 23 are provided to act as seals against the cutting machine spindle.

If it is necessary to provide manually operated nozzles, threaded output apertures 24 receive the manual nozzles as is well known. In order to secure top plate 1, lower plate 2 and cone plate 20 and related structure together to form the complete apparatus, multiple counterbored threaded apertures 25 extend through top plate 1 and lower plate 2 and partially into cone plate 20 so as to receive socket head cap screws which are screwed into apertures 25.

In operation, fluid is introduced under pressure into the apparatus through inlet aperture 7 and flows into feeder channel 12. Of course, fluid in this context includes water, oil and air or a combination thereof. In accordance with the particular program in use, pneumatic cylinder 3 is responsive thereto to move spool 4 coaxially in chamber 5 in order to position annular notch 6 in alignment with the predetermined one of gates 8-11. By this means, fluid contained within feeder channel 12 is caused to flow through the respective gate 8-11 and traverse spool 4 around annular notch 6 and into one of the channels 13, 14, 16 or 17 and out through the corresponding four nozzles 19 associated with that particular channel. As the cutting tools are automatically changed, pneumatic cylinder 3 is activated by a programmable solenoid value to align annular notch 6 with whichever gate 8-11 and corresponding channel is required to produce the desired cooling for the particular cutting tool in use. Since four nozzles 19 are interconnected with each channel, virtually a 360-degree spray pattern is achieved surround the cutting tool to be cooled. Although the nozzles are shown in an alternating equally spaced pattern, the nozzles are positionable in any pattern. Also, in order to provide uninterrupted fluid flow, nozzles 19 associated with inner channels 14 and 17 are directed outwardly and nozzles 19 associated with outer channels 13 and 16 are directed inwardly.

Figure 9:
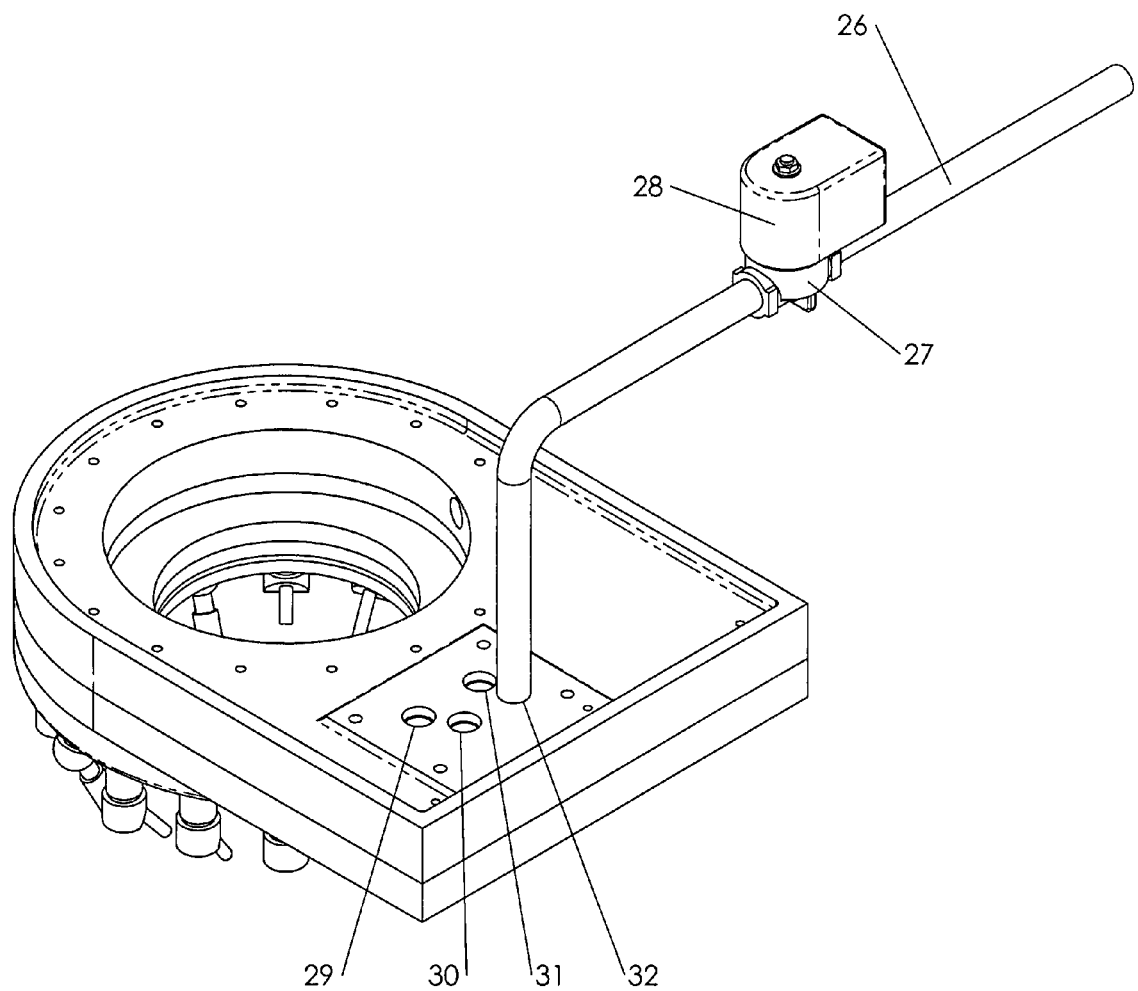
FIG. 9 is a perspective view of an alternative form of the invention.

Another version of the invention is shown in FIG. 9 and includes fluid inlet conduit 26 which in effect replaces feeder channel 12. In order to control the flow of fluid through conduit 26, flapper valve 27, which in effect replaces spool 4, is operably interconnected to conduit 26 and is controlled, in known manner, by means of solenoid 28, which in effect replaces pneumatic cylinder 3. Conduit 26 is interconnected to one of intake apertures 29, 30, 31 and 32 which are interconnected directly with the associated one of channels 13, 14, 16 and 17. Although one solenoid controlled conduit 26 is shown in FIG. 9, in actual operation, there are separate conduits interconnected to each of the apertures 29-32. Each of the apertures 29-32 is in direct fluid communication with the respective one of channels 13, 14, 16 and 17. By this means, any type of fluid, i.e., water, oil or air or a combination is introduced into either a single channel or multiple channels as desired in accordance with cooling requirements.

Figure 10:
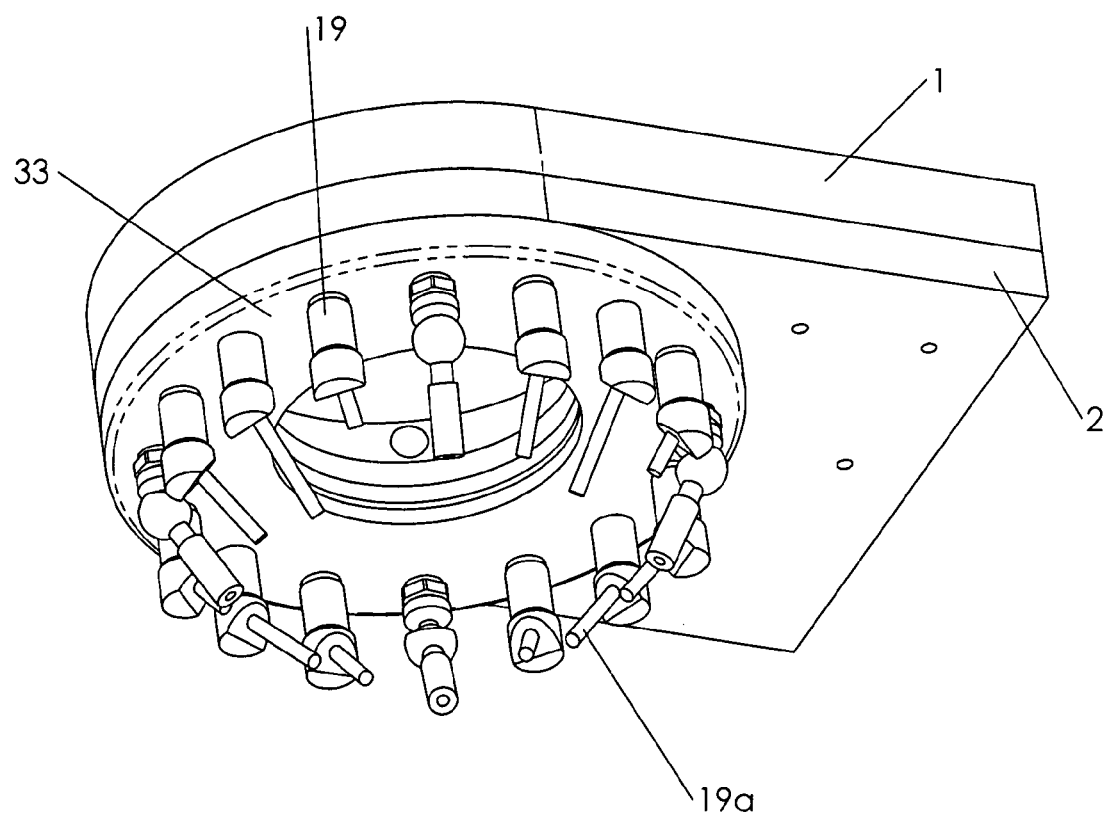
FIG. 10 is a perspective view of another version of the apparatus shown in FIG. 8.

Another version of the invention is shown in FIG. 10 wherein cone plate 20 is replaced with a circular plate such that the notches around the periphery of cone plate 20 are eliminated and the nozzles associated with channels 13 and 14 are extended through apertures in circular plate 33 to positions whereby they are in effect in substantially the same plane as the nozzles associated with channels 16 and 17. Two apertures 33a and 33b are formed in cone 21 so that aperture 33a is in fluid communication with one or more of the channels 13, 14, 16 and 17. Fluid entering aperture 33a cools the machine spindle and flows out through aperture 33b through any of the nozzles 19.

Therefore, by this invention, a cooling manifold apparatus is provided which is programmable with 16 different spraying nozzles to provide four sets of four nozzles. Also, since the apparatus is programmable, it is much safer than known systems by not requiring an operator to manually reposition a nozzle while the tool machine is in operation. The apparatus is compact because the pairs of channels are in effect stacked on top of each other. By stacking the channels, a full array of 16 nozzles is achieved. If the four channels were disposed in the same plane, they would intersect and thereby interrupt necessary fluid flow.

The invention claimed is:

1. Cutting tool coolant apparatus comprising a top plate and a lower plate disposed in flat face contacting relation, a channel formed between said plates, a nozzle in fluid communication with said channel, control means to selectively direct fluid to said channel, said control means comprising a spool coaxially disposed in a chamber, said chamber being disposed within said top and lower plates, an annular notch formed around said spool, said channel comprising an end, and said notch adapted for selective alignment with the end of said channel.

2. Apparatus according to claim 1 wherein an inlet port is formed in said top plate, said inlet port is in fluid communication with a feeder channel, a pair of channels are formed within said plates, said channels comprise ends, gates are formed respectively on said ends of said channels, and said gates are in fluid communication with said feeder channel.

3. Apparatus according to claim 1 wherein a cone plate is affixed to said lower plate on the side opposite said top plate.

4. Apparatus according to claim 3 wherein a cone is affixed to said cone plate on the side opposite said lower plate.

5. Apparatus according to claim 1 wherein when a circular plate is affixed to said lower plate on the side opposite said top plate.

6. Apparatus according to claim 1 wherein said channels are formed respectively by a pair of semicircular channel members formed respectively in said top and lower plates.

7. Apparatus according to claim 3 wherein a pair of channels are formed between said lower plate and said cone plate.

8. Apparatus according to claim 7 wherein a nozzle is in fluid communication with each of said channels.

9. Programmable cutting tool coolant apparatus comprising a top plate and a spaced cone plate, a lower plate disposed intermediate said top and cone plate and in face contacting relation therewith, a first channel disposed within said top and lower plates, a second channel disposed within said lower and cone plates, said channels disposed in vertically spaced parallel planes, an inlet in fluid communication with said channels, a pair of nozzles interconnected respectfully with said channels and in fluid communication with said inlet, and said nozzles being vertically staggered.

10. Apparatus according to claim 9 wherein control means selectively directs fluid to said channels.

11. Apparatus according to claim 10 wherein a gate is disposed on one end of each of said channels.

12. Apparatus according to claim 11 wherein said control means comprises a spool coaxially disposed in a chamber, said chamber is disposed within said apparatus, an annular notch is formed around said spool, and said notch is adapted for selective alignment with said gates.

13. Apparatus according to claim 10 wherein said control means comprises a solenoid.

14. Apparatus according to claim 13 wherein said control means comprises multiple solenoids.

15. Apparatus according to claim 14 wherein said solenoid activates a flapper valve.

16. Apparatus according to claim 2 wherein said channels are disposed in the same plane, one of said channels is disposed substantially outside the other of said channels, a pair of nozzles are in fluid communication respectively with said channels, said nozzle associated with said one channel is directed inwardly, and the nozzle associated with said other channel is directed outwardly.

17. Apparatus according to claim 4 wherein at least one aperture is formed in said cone to receive cooling fluid.

18. Apparatus according to claim 17 wherein cooling fluid is dispersed through another aperture formed in said cone.

19. Apparatus according to claim 8 wherein said nozzles are disposed in different horizontal planes.

* * * * *